(12) United States Patent
Srivastava et al.

(10) Patent No.: US 8,299,436 B2
(45) Date of Patent: Oct. 30, 2012

(54) HIGH ENERGY RESOLUTION SCINTILLATORS HAVING HIGH LIGHT OUTPUT

(75) Inventors: Alok Mani Srivastava, Niskayuna, NY (US); Steven Jude Duclos, Clifton Park, NY (US); Lucas Lemar Clarke, Uniontown, OH (US); Holly Ann Comanzo, Niskayuna, NY (US); Qun Deng, Shanghai (CN)

(73) Assignee: General Electric Company, Niskayuna, NY (US)

( * ) Notice: Subject to any disclaimer, the term of this patent is extended or adjusted under 35 U.S.C. 154(b) by 1805 days.

(21) Appl. No.: 11/172,533

(22) Filed: Jun. 29, 2005

(65) Prior Publication Data

US 2007/0001118 A1    Jan. 4, 2007

(51) Int. Cl.
*G01T 1/20* (2006.01)
(52) U.S. Cl. .............................. 250/361 R; 252/301.4 H
(58) Field of Classification Search .............. 250/361 R; 252/301.4 H
See application file for complete search history.

(56) References Cited

U.S. PATENT DOCUMENTS

| | | | |
|---|---|---|---|
| 3,599,109 A * | 8/1971 | Guggenheim et al. ........ 372/41 |
| 3,623,907 A | 11/1971 | Watts | |
| 3,988,252 A * | 10/1976 | Ferretti ................ 252/301.4 H |
| 4,525,628 A * | 6/1985 | DiBianca et al. ............ 250/367 |
| 4,596,927 A * | 6/1986 | Hopkinson et al. ........ 250/269.8 |
| 5,015,860 A * | 5/1991 | Moses .................... 250/361 R |
| 5,028,509 A * | 7/1991 | Shimada et al. ............ 430/139 |
| 5,439,616 A * | 8/1995 | Ishiwata et al. ............... 252/584 |
| 5,639,399 A * | 6/1997 | Iwase et al. ............ 252/301.4 H |
| 6,159,686 A | 12/2000 | Kardos et al. | |
| 6,706,212 B2 | 3/2004 | Venkataramani et al. ..................... 252/301.4 F |
| 2002/0171046 A1 | 11/2002 | Kawabata et al. | |
| 2003/0193040 A1 | 10/2003 | Venkataramani et al. ..................... 252/301.4 F |

FOREIGN PATENT DOCUMENTS

| | | |
|---|---|---|
| DE | 2018352 | 10/1970 |
| EP | 0851436 | 7/1998 |
| FR | 2855830 | 12/2004 |
| JP | 09263757 | 10/1997 |
| JP | 10330745 | 12/1998 |

OTHER PUBLICATIONS

U.S. Appl. No. 10/689,361, filed Oct. 17, 2003, Srivastava et al.
U.S. Appl. No. 11/073,110, filed Mar. 4, 2005, Srivastava et al.
U.S. Appl. No. 11/095,233, filed Mar. 30, 2005, Srivastava et al.

* cited by examiner

*Primary Examiner* — David Porta
*Assistant Examiner* — Shun Lee
(74) *Attorney, Agent, or Firm* — Andrew J. Caruso

(57) ABSTRACT

A scintillator composition includes a matrix material, where the matrix material includes an alkaline earth metal and a lanthanide halide. The scintillator composition further includes an activator ion, where the activator ion is a trivalent ion. In one embodiment, the scintillator composition includes a matrix material represented by $A_2LnX_7$, where A includes an alkaline earth metal, Ln includes a lanthanide ion, and X includes a halide ion. In another embodiment, the scintillator composition includes a matrix material represented by $ALnX_5$, where A includes an alkaline earth metal, Ln includes a lanthanide ion, and X includes a halide ion. In these embodiments, the scintillator composition includes an activator ion, where the activator ion includes cerium, or bismuth, or praseodymium, or combinations thereof.

7 Claims, 5 Drawing Sheets

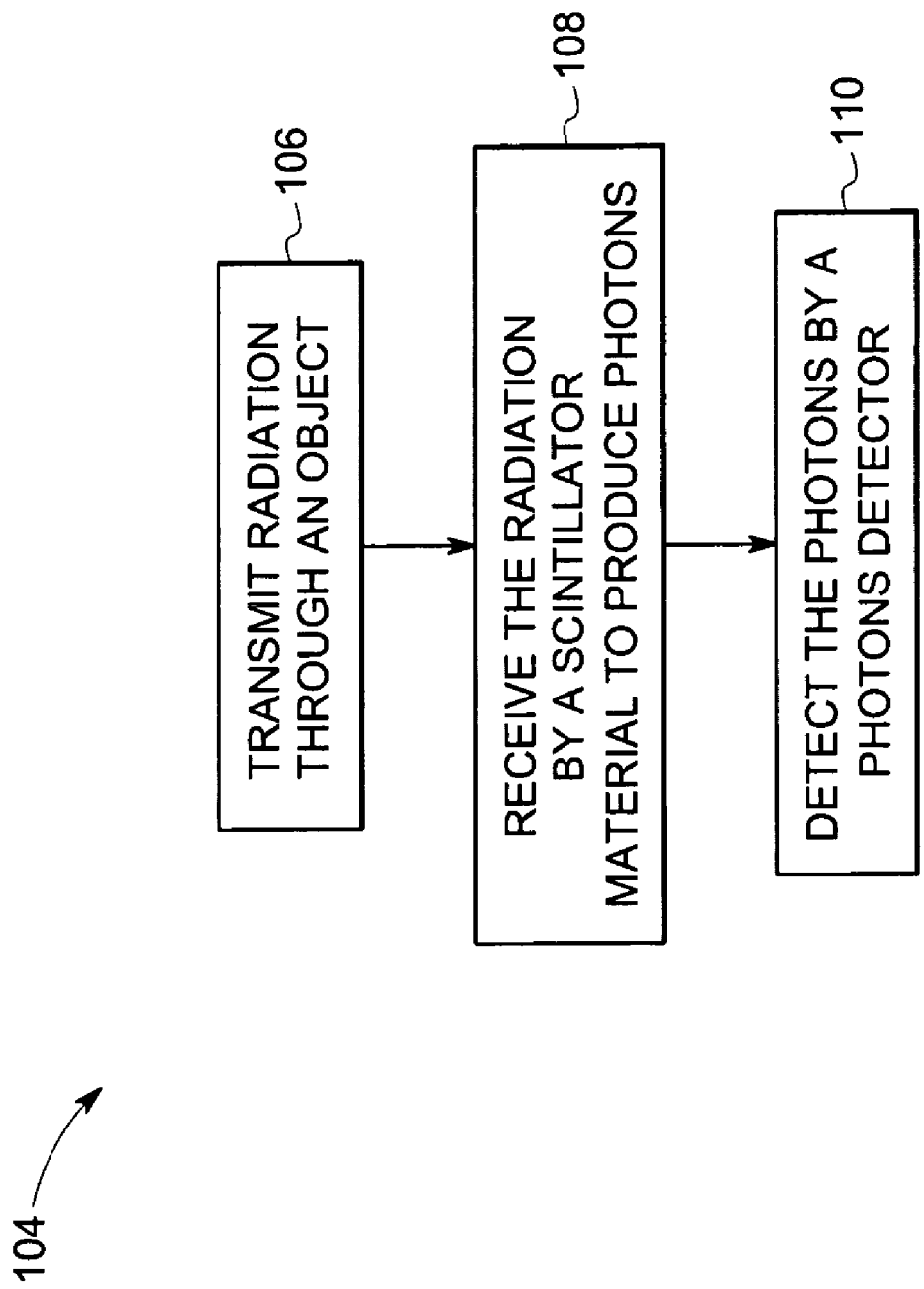

HIGH ENERGY RESOLUTION
SCINTILLATORS HAVING HIGH LIGHT
OUTPUT

BACKGROUND

The invention relates generally to the field of imaging systems and, more particularly, to scintillator compositions for use in high-energy radiation detectors.

High-energy radiation based imaging systems, such as positron emission tomography (PET), generally employ a scintillator detector having a plurality of pixels typically arranged in a circular array. Each such pixel comprises a scintillator cell coupled to a photomultiplier tube. In PET, a chemical tracer compound having a desired biological activity or affinity for a particular organ is labeled with a radioactive isotope that decays by emitting a positron. Subsequently, the emitted positron interacts with an electron giving out two 511 keV photons (gamma rays). The two photons emit simultaneously and travel in almost exactly opposite directions, penetrate the surrounding tissue, exit the patient's body, and become absorbed and recorded by the detector. By measuring the slight difference in arrival times of the two photons at the two points in the detector, the position of the positron inside the target can be calculated. The limitations of this time difference measurement are highly dependent on the stopping power, light output, and decay time of the scintillator material.

Another application of such scintillators is in well-logging tools. The scintillator detector in this application functions by capturing radiation from the surrounding geological formation, and converting it into light. The generated light is then transmitted to a photomultiplier tube. The light impulses are transformed into electrical impulses. It is desirable that the scintillation element in the well-logging tool be able to function at very high temperatures, and under harsh shock and vibration conditions. Accordingly, it is desirable to have a scintillator material, which has a combination of many of the properties discussed previously, e.g., high light output and energy resolution, as well as fast decay time.

Accordingly, a need exists for an improved scintillator material that may address one or more of the problems set forth above.

BRIEF DESCRIPTION

In one embodiment, the present technique provides a scintillator composition. The scintillator composition includes a matrix material, where the matrix material includes an alkaline earth metal and a lanthanide halide. The scintillator composition further includes an activator ion, where the activator ion is a trivalent ion.

In another embodiment, the present technique provides a scintillator composition having a matrix material represented by $A_2LnX_7$, where A includes an alkaline earth metal, Ln includes a lanthanide ion, and X includes a halide ion. Further, the scintillator composition includes an activator ion, where the activator ion includes cerium, or bismuth, or praseodymium, or combinations thereof.

In yet another embodiment, the present technique provides a scintillator composition having a matrix material represented by $ALnX_5$, where A includes an alkaline earth metal, Ln includes a lanthanide ion, and X includes a halide ion. Further, the scintillator composition includes an activator ion, where the activator ion includes cerium, or bismuth, or praseodymium, or combinations thereof.

In further embodiment, the present technique provides a detector element of an imaging system having a scintillator composition of the present technique. Further, the detector element has a photon detector optically coupled to the scintillator composition and configured to convert the photons into electrical signals.

In another embodiment, the present technique provides a method of operation of a detector element. The method includes transmitting radiation through an object, receiving the radiation by a scintillator material to produce photons which are characteristic of the radiation, and detecting the photons by a photon detector optically coupled to the scintillator material and configured to convert the photons into electrical signals. The scintillator material includes the scintillator composition of the present technique.

DRAWINGS

These and other features, aspects, and advantages of the present invention will become better understood when the following detailed description is read with reference to the accompanying drawings in which like characters represent like parts throughout the drawings, wherein:

FIG. 7 is a flow chart illustrating an exemplary method of operation of a detector element of an imaging system according to certain embodiments of the present technique.

DETAILED DESCRIPTION

Figure 1:
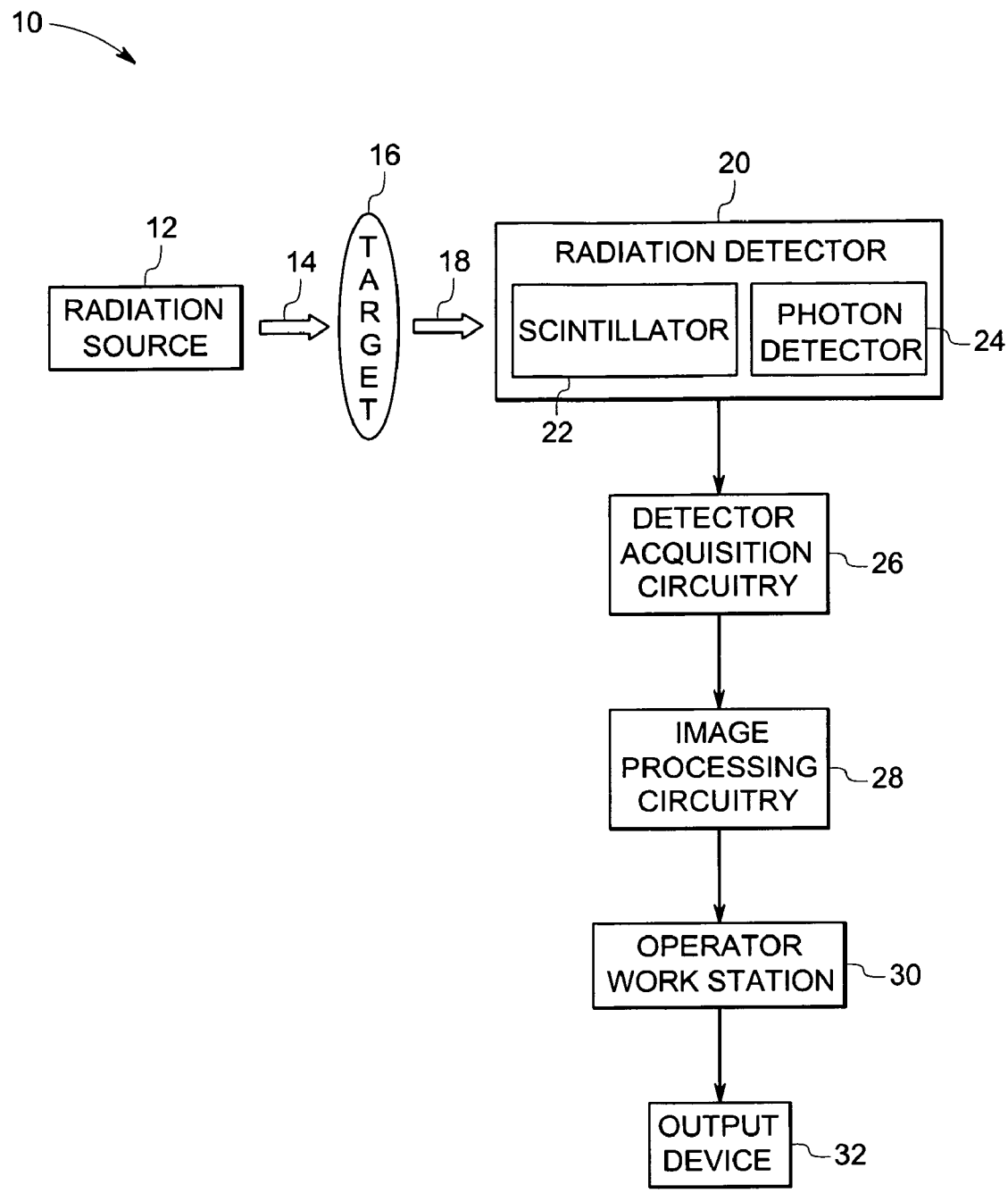
FIG. 1 is a diagrammatical representation of an exemplary radiation-based imaging system employing a scintillator composition according to certain embodiments of the present technique.

FIG. 1 illustrates an exemplary radiation-based imaging system, such as a nuclear imaging detector employed in a positron emission tomography, in accordance with certain embodiments of the present technique. In the illustrated embodiment, the imaging system 10 includes a radiation source 12 positioned such that a major portion of the radiation 14 emitted from the radiation source 12 passes through the target 16, such as an animal, or a human, or a baggage item, or any target having internal features or contents. In certain embodiments, the radiation 14 may include electromagnetic radiation, such as X-ray radiation, or beta radiation, or gamma radiation. A portion of the radiation 14, generally termed as attenuated radiation 18, passes through the target 16. More specifically, the internal features of the target 16 at least partially reduce the intensity of the radiation 14. For example, one internal feature of the target 16 may pass less or more radiation than another internal feature.

Subsequently, the attenuated radiation 18 impinges on one or more radiation detectors 20, which include a scintillator 22 that produces visible photons in response to the impinging attenuated radiation on its surface. In certain embodiments, the composition of the scintillator 22 includes a matrix material and an activator ion. In some embodiments, the matrix material includes an alkaline earth metal and a rare earth element halide. In these embodiments, the alkaline earth metal may include barium, or strontium, or calcium, or magnesium, or combinations thereof. Further, the rare earth element halide may include at least one rare earth element ion and at least one halide ion. In these embodiments, the rare earth element includes lanthanum, or cerium, or praseodymium, or neodymium, or samarium, or europium, or yttrium, or gadolinium, or terbium, or dysprosium, or holmium, or erbium, or thulium, or lutetium, or scandium, or ytterbium, or combinations thereof. In an exemplary embodiment, the rare earth element may include lanthanum, or yttrium, or gadolinium, or lutetium, or scandium, or combinations thereof.

Depending on the different applications, in these embodiments, the halide ion may include fluorine, or bromine, or chlorine, or iodine, or combinations thereof. For example, it is desirable to have iodine to obtain high light output characteristics in the scintillator. Additionally, in some embodiments, two or more halides may be present in the matrix material. In these embodiments, the matrix material may be in the form of a solid solution of the two or more rare earth element halides. As used herein, the term "solid solution" refers to a mixture of the halides in solid, crystalline form, which may include a single phase or multiple phases. As will be appreciated, phase transitions may occur within a crystal after its formation, e.g., after subsequent processing steps, such as sintering or densification. In an exemplary embodiment, the rare earth element halide may include lutetium chloride, or lutetium bromide, or yttrium chloride, or yttrium bromide, or gadolinium chloride, or gadolinium bromide, or praseodymium chloride, or praseodymium bromide, or combinations thereof.

Further, in certain embodiments, the relative proportions of the alkaline earth metal and the lanthanide rare earth element halide in the matrix material may vary from about 2.2:1 to about 1.8:1. As will be appreciated, these proportions will depend on the stoichiometric considerations, such as valency, atomic weight, chemical bonding, co-ordination number, and the like.

As will be appreciated, oxygen may have a detrimental effect on the luminescence of the scintillator compositions. Accordingly, it is desirable to have the rare earth element halide of the matrix material substantially free of oxygen, or oxygen containing compounds. As used herein, "substantially free" indicates a compound containing less than about 0.1 mole percent oxygen, and preferably, less than about 0.01 mole percent of oxygen.

Further, the scintillator composition includes an activator ion, where the activator ion is a trivalent ion. As will be appreciated, an activator ion is the luminescent center of the host matrix, which produces the luminescence by absorption of the electrons and releasing the energy of its excitation as photons of desired wavelengths. Hence, it is desirable to have a combination of activator ion and scintillator composition that are mutually amicable. In certain embodiments, the activator ion may include trivalent ions, such as cerium, or bismuth, or praseodymium, or combinations thereof. Also, it may be desirable to have the activator ion in an amount that facilitates scintillation of the scintillator composition. As will be appreciated, the amount of the activator ion in the scintillator composition depends on factors such as the matrix material, emission properties and decay time, and also the type of detection device in which the scintillator is being employed. In some embodiments, the mole percentage of the activator ion in the matrix material may range from about 0.1 mole percentage to about 20 mole percentage, or from about 0.1 mole percentage to about 10 mole percentage, or from about 1 mole percentage to about 10 mole percentage.

In certain embodiments, the scintillator composition of the present technique may be represented by a chemical formula $A_2LnX_7$, where A includes an alkaline earth metal, Ln includes a rare earth element ion, and X includes a halide ion. As will be appreciated, A, or Ln, or X may be a combination of two or more different ions in these embodiments. Further, in these embodiments, each alkaline earth metal has a valence state of +2, each rare earth element usually has a valence state of +3, and each halogen has a valence state of −1 to maintain the stoichiometric balance. In these embodiments, A may include barium, or strontium, or calcium, or magnesium, or combinations thereof. In addition, Ln may include lanthanum, or cerium, or praseodymium, or neodymium, or samarium, or europium, or yttrium, or gadolinium, or terbium, or dysprosium, or holmium, or erbium, or thulium, or lutetium, or scandium, or ytterbium, or combinations thereof in these embodiments. Finally, X may include fluorine, or chlorine, or bromine, or iodine, or combinations thereof in these embodiments.

Further, in some embodiments, Ln may include yttrium, or gadolinium, or lutetium, or lanthanum, or combinations thereof. In these embodiments, X may include chlorine, or bromine, or iodine, or combinations thereof. In some of these embodiments with cerium as the activator ion, the scintillator composition may be represented by a chemical formula $A_2Ln_{1-m}Ce_mX_7$. In these embodiments, m ranges from about 0.02 to about 1. Further, in an exemplary embodiment, m ranges from about 0.1 to about 1. In an exemplary embodiment, the scintillator composition $Ba_2Y_{1-m}Ce_mCl_7$ having cerium as an activator ion may include $Ba_2Y_{0.98}Ce_{0.02}Cl_7$, and $Ba_2Y_{0.95}Ce_{0.05}Cl_7$. Likewise, in other embodiments, the scintillator composition $Ba_2Gd_{1-m}Ce_mCl_7$ having Ce as an activator ion may include $Ba_2Gd_{0.98}Ce_{0.02}Cl_7$, $Ba_2Gd_{0.98}Ce_{0.02}Cl_{6.94}Br_{0.06}$, and $Ba_2Gd_{0.95}Ce_{0.05}Cl_7$. In further embodiments, the scintillator composition may include a combination of alkaline earth metals. In these embodiments, the scintillator composition may be represented by $Ba_{2-x}A_xLn_{1-m}Ce_mX_7$, where A may be strontium, or calcium, or magnesium. In these embodiments, the proportion of A is such that the crystal structure of the scintillator composition is retained. As with cerium, in an exemplary embodiment, other activator ion, such as bismuth, may replace about 0.1 mole percentage to about 10 mole percentage of Ln in the scintillator composition.

In some embodiments, the scintillator composition may be represented by a chemical formula $ALnX_5$, where A includes an alkaline earth metal, Ln includes a rare earth element ion, and X includes a halide ion. As discussed above, with reference to scintillator composition $A_2LnX_7$, each alkaline earth metal has a valence state of +2, each rare earth element usually has a valence state of +3, and each halogen has a valence state of −1, to maintain the stoichiometric balance. In these embodiments, A may include barium, or strontium, or calcium, or magnesium, or combinations thereof. In addition, Ln may include lanthanum, or cerium, or praseodymium, or neodymium, or samarium, or europium, or yttrium, or gadolinium, or terbium, or dysprosium, or holmium, or erbium, or thulium, or lutetium, or scandium, or ytterbium, or combinations thereof in these embodiments. Finally, X may include fluorine, or chlorine, or bromine, or iodine, or combinations thereof in these embodiments.

Further, in some embodiments, Ln may include yttrium, or gadolinium, or lutetium, or lanthanum, or combinations thereof. In these embodiments, X may include chlorine, or bromine, or iodine, or combinations thereof. In some of these embodiments, the scintillator compositions may be represented by a formula $ALn_{1-n}Ce_nX_5$. In these embodiments, n ranges from about 0.02 to about 1. Further, in an exemplary embodiment, n ranges from about 0.02 to about 0.2. In another exemplary embodiments, n ranges from about 0.02 to about 0.1. In an exemplary embodiment, the scintillator composition along with the activator ion is represented by $BaY_{0.98}Ce_{0.02}Cl_5$, or $BaGd_{0.98}Ce_{0.02}Cl_5$. In further embodiments, the scintillator composition may include a combination of alkaline earth metals. In these embodiments, the scintillator composition may be represented by $Ba_{1-x}A_x Ln_{1-m}Ce_mX_5$, where A may be strontium, or calcium, or magnesium. Further, in these embodiments, the proportion of A is such that the crystal structure of the parent material is maintained. As with cerium, in an exemplary embodiment, other activator ion, such as bismuth, may replace about 0.1 mole percentage to about 10 mole percentage of Ln in the scintillator composition.

In certain embodiments, the scintillator composition may comprise a substantially monocrystalline form. As will be appreciated, monocrystalline scintillator crystals have a greater tendency for transparency and, hence, are especially useful for high-energy radiation detectors, e.g., those used for gamma rays. However, the scintillator composition may also be used in other forms, such as powder form, depending on the end use. Also, as will be appreciated, the scintillator composition may contain small amounts of impurities. These impurities usually originate from the starting material and constitute less than about 0.01 percent by weight of the composition. Further, the scintillator composition may also include additives in an amount of less than about 1 volume percentage. Usually, additives are added to facilitate higher sintered density of the scintillator upon compaction, as described in detail below. Moreover, additives may facilitate optimization of the crystal field environment to enhance scintillation efficiency and reduce rise and decay times of the scintillator composition, thereby facilitating effective proton yield per unit time. Accordingly, a scintillator with higher density results in increased absorption of the incident photons by the scintillator. Also, a scintillator having a higher density results in less scattering of the photons produced by the scintillator and, therefore, enhances the signal produced by the scintillator. Moreover, minor amounts of other materials may be purposefully included in the scintillator composition to enhance specific functionalities in the scintillator composition.

Referring again to FIG. 1, once the scintillator 22 produces the photons, they are detected by employing a photon detector or counter 24. In some embodiments, the photon counter 24 includes a photodiode configured to convert the photons into respective electronic signals. In some of these embodiments, the photon counter 24 is coupled to a photomultiplier tube to proportionately enhance the signals produced by the photon counter 24. The imaging system 10 then processes this data to construct an image of the internal features within the target 16. Although not illustrated, the radiation detector 20 may employ a collimator for collimating beams directed towards the radiation detector 20 and, thereby, enhance the absorption percentage of the incident light on the radiation detector 20. In addition, the imaging system 10 of FIG. 1 may include a variety of control circuits and devices. For example, as illustrated, the radiation detector 20 is coupled to detector acquisition circuitry 26, which controls acquisition of the signals generated in the radiation detector 20. In certain embodiments, the imaging system 10 includes a motor subsystem (not shown) to facilitate motion of the radiation source 12 and/or the detector 20. In these embodiments, image processing circuitry 28 is employed to execute examination of protocols and to process acquired image data from the detector acquisition circuitry 26. These and various other control mechanisms may be incorporated into the imaging system 10 in accordance with certain embodiments of the present technique.

As an interface to the imaging system 10, one or more operator workstations 30 may be included for outputting system parameters, requesting examination, viewing images, and so forth. The operator workstation 30 is configured to enable an operator, via one or more input devices (keyboard, mouse, touchpad, etc.), to control one or more components of the imaging system 10. The illustrated operator workstation 30 is coupled to an output device 32, such as a display or printer, to output the images generated during operation of the imaging system 10. In general, displays, printers, operator workstations, and similar devices may be local or remote from the imaging system 10. For example, these interface devices may be positioned in one or more places within an institution or hospital, or in an entirely different location. Therefore, the interface devices may be linked to the image system 10 via one or more configurable networks, such as the internet, virtual private networks, and so forth. These and other input/output devices or interfaces may be incorporated into the imaging system 10 in accordance with embodiments of the present technique.

Figure 2:
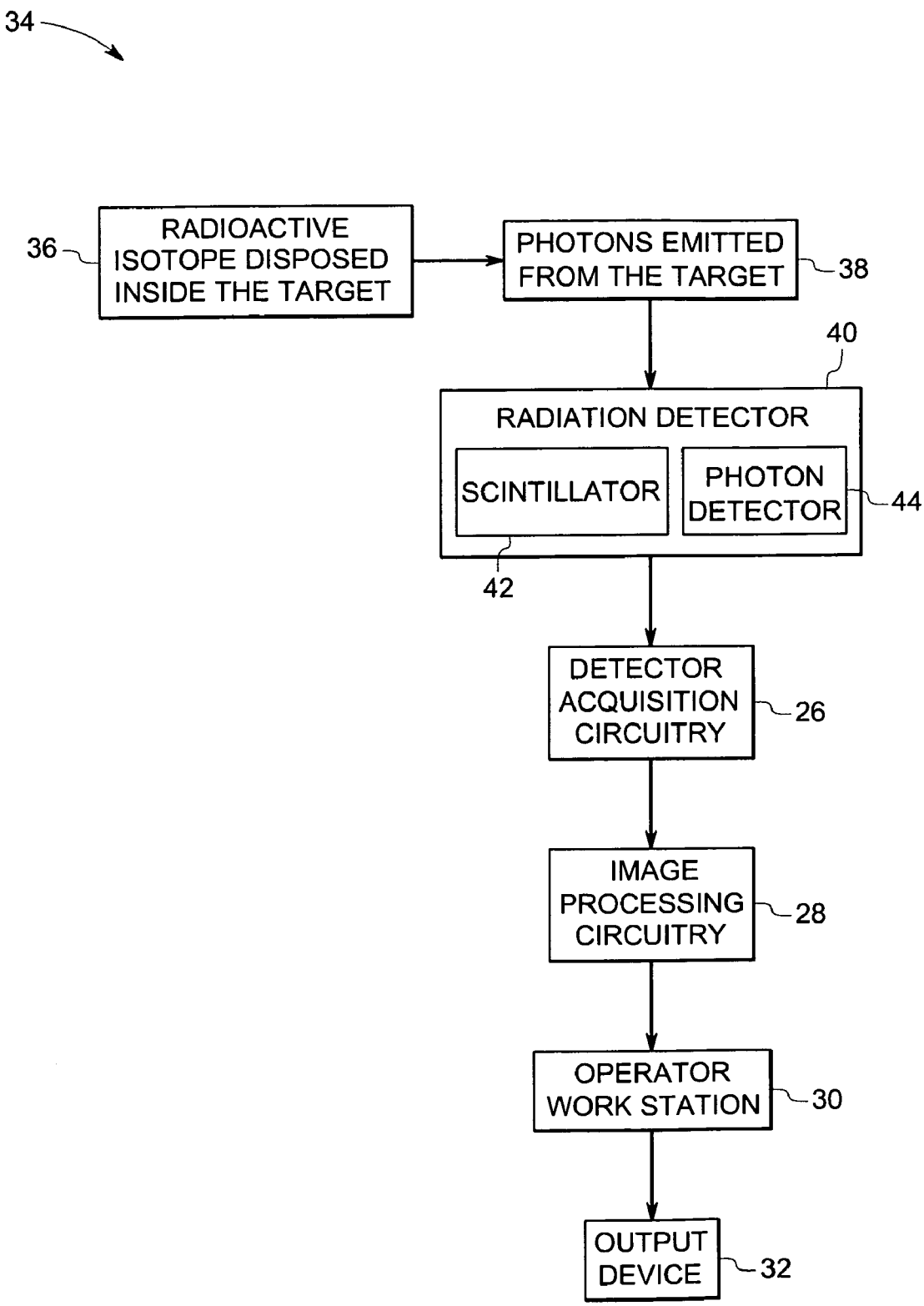
FIG. 2 is a diagrammatical representation of an exemplary positron emission tomography imaging system employing a scintillator composition according to certain embodiments of the present technique.

FIG. 2 illustrates an exemplary positron emission tomography (PET) imaging system 34 in accordance with certain embodiments of the present technique. In the illustrated embodiment, the PET imaging system 34 includes a radioactive substance 36 disposed within a target. In an exemplary embodiment, the target may be a human having an injection of a radioactive isotope. Typically, the radioactive isotope is administered to desired locations inside a human by tagging it along with a natural body compound, such as glucose, ammonia, water, etc. In general, after the dose of the radioactive isotope is administered inside the target, the radioactive substance, during its lifetime, emits radiation 38 that is detected by the radiation detector 40 (scintillator 42 and photon detector 44). Once inside the target (e.g., body of human), the radioactive substance 36 localizes the radioactivity in the biologically active areas or other areas to be detected. In an exemplary embodiment, where the target is a human or an animal, the biologically active areas may include a cerebral or cardiac profusion, Alzheimer, Parkinson, epilepsy, hibernating myocardium, cancer, or tumor. Typically, a dose of the radioactive substance 36 includes a radioactive isotope, which emits positrons and is disposed inside a target in a function-specific or tissue-specific manner. As will be appreciated by those skilled in the art and as described in detail below, the positron emitted from the radioactive isotope annihilates by reaction with electrons to produce two photons or two gamma rays each having energy of 511 KeV. These photons then penetrate out of the target and are detected via the radiation detector 40, i.e., PET scanner.

In the illustrated embodiment, the radiation detector or the PET scanner 40 includes a scintillator 42 having the scintillator composition as described above with reference to FIG. 1. Further, the radiation detector 40 includes a photon detector 44, such as a photodiode. Further, the PET imaging system 34 may include detector acquisition circuitry 26, image processing circuitry 28, operator workstation 30, and an output device 32 as described with reference to imaging system 10 of FIG. 1.

As will be appreciated by those skilled in the art, in case of living targets, such as human beings or animals, in order to avoid any adverse affects of the radioactive isotope, it is desirable to administer a minimal amount of the radioactive substance 36 inside the target. The amount of photons produced by this minimal amount of radioactive substance 36 is best detected by scintillators with relatively higher sensitivity, higher density, and higher luminous efficiency. Also, a short decay time advantageously reduces the integration time during the determination of the intensity of the input radiation, so that the image rate for the generation of images and/or projections can be significantly increased. As a result, the occurrence of artifacts, such as shadow image, is reduced. Moreover, examination time is reduced for the patient, because more single images can be measured within a shorter period of time. Also, it is desirable to have a scintillator 42 which has effective stopping power, because the high density of the scintillator 42 facilitates absorption of a relatively greater number of photons without losing them as a result of scattering in the scintillator. The scintillator compositions described in detail above advantageously have some or all of these characteristics.

Figure 3:
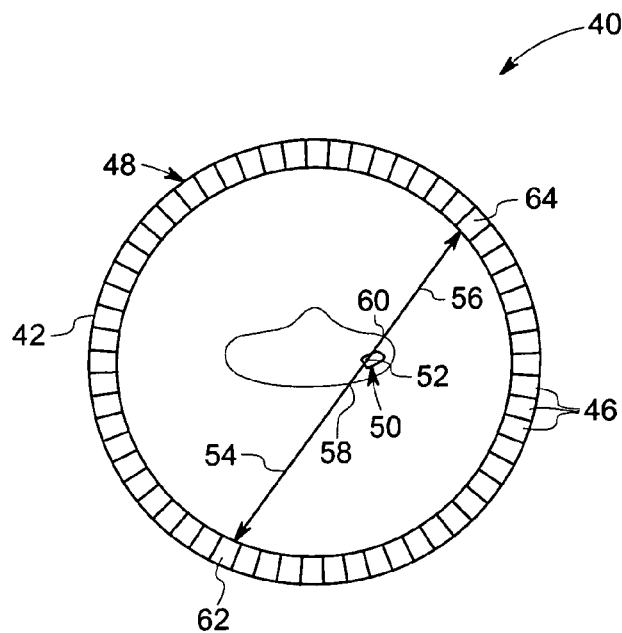
FIG. 3 is a front view of a scintillator ring used in a radiation detector of a positron emission tomography imaging system according to certain embodiments of the present technique.

FIG. 3 is a cross sectional view of the radiation detector 40 employed in a PET imaging system 34 (see FIG. 2) in accordance with certain embodiments of the present technique. In the illustrated embodiment, the radiation detector 40 employs a plurality of detector elements 46 arranged in a cylindrical configuration with a circular cross section, such that the detector elements 46 surround the target object. In this circular or cylindrical configuration, the two photons penetrated out of the target can reach any two opposite detector elements 46 located on the scintillator ring 48. In some embodiments, the scintillator ring 48 may include one or more layers of the scintillator 42, which in turn is disposed over a layer including photon detectors 44 (not shown). In other embodiments, the scintillator 42 may be in the form of an array of pixels, where each individual pixel is coupled to a pixel of the photon detector (not shown). In other words, one or more layers having an array formed by the pixels of the scintillator 42 may be disposed over another layer formed by an array formed by the pixels of the photon detector 46.

In the illustrated embodiment, a target having a radioactive isotope localized in a biologically active region 50 is disposed inside the scintillator ring 48 of the radiation detector 40. As described above, the radioactive isotope emits a positron upon decay. In certain embodiments, the decay is a beta decay. The emitted positron travels at a very high speed and is usually slowed down due to collisions with one or more neighboring atoms. Once the positron is slowed down, the annihilation reaction takes place between the positron and an outer-shell electron of one of the neighboring atoms. As will be appreciated by those skilled in the art, the annihilation reaction produces two 511 KeV photons or gamma rays, which travel in almost exactly opposite directions as shown by arrows 54 and 56 due to conservation of energy and momentum. More specifically, the two detector points along with the origin point 52 of the photon in the biologically active site 50 form a straight line. In other words, the origin point 52 in the biologically active site 50 occurs along a straight line connecting the two detector elements 62 and 64. For example, in the illustrated embodiment, the two photons traveling in the direction shown by the arrows 54 and 56 reach the detector elements 62 and 64 respectively, such that the points 52, 62, and 64 lie on the same straight line. Hence, detection of photons on two points of the scintillator ring 48 indicates existence of the radioactive isotope in the desired location, such as a biologically active area in a human target.

Figure 4:
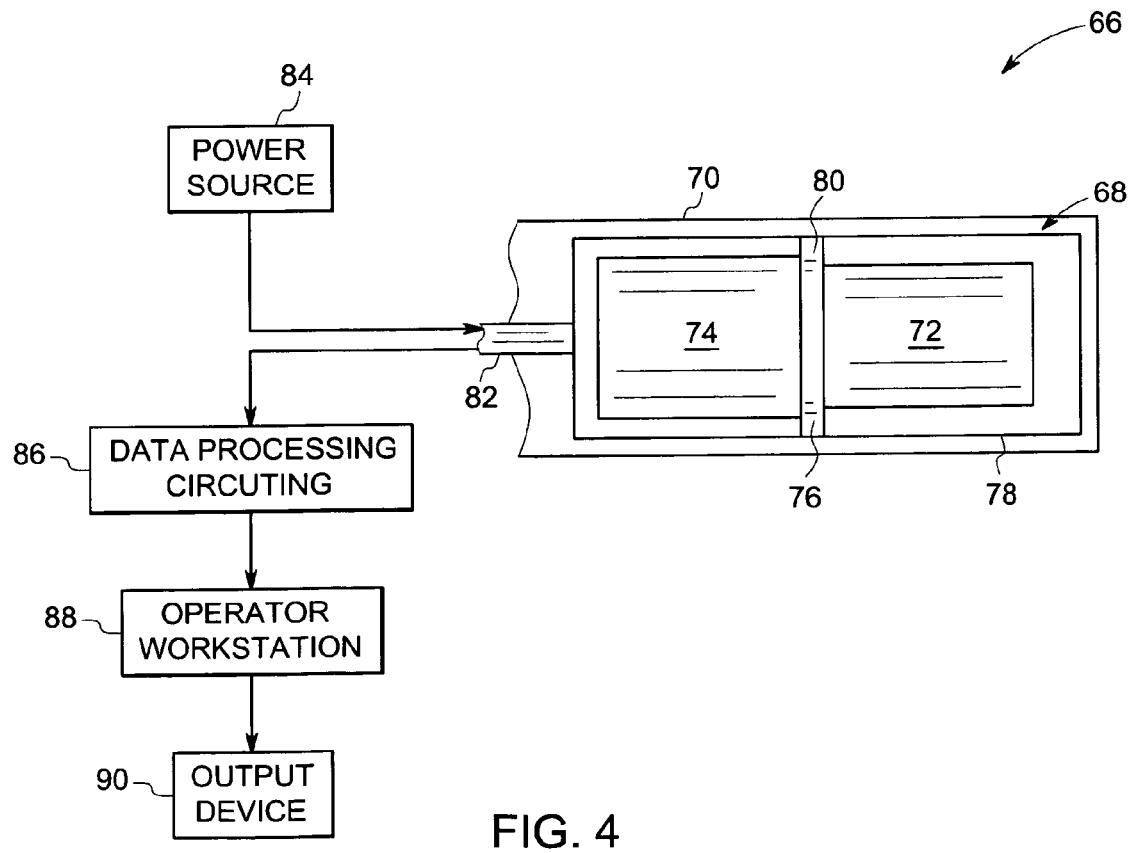
FIG. 4 is a cross-sectional view of an exemplary detector element employed in a well-logging tool according to certain embodiments of the present technique.

FIG. 4 is a cross sectional view of an exemplary well-logging tool 66 employing a detector assembly 68 coupled to a tool housing 70. In the illustrated embodiment, the detector assembly 68 employs a scintillator crystal 72 and a light-sensing device 74 (e.g., photomultiplier tube) optically coupled together by an optical interface 76. As will be appreciated, the light-sensing device 74 converts the light photons emitted from the crystal 72 into electrical pulses that are shaped and digitized by the associated electronics as described below. In certain embodiments, the scintillator crystal 72 may employ a scintillator composition of the present technique as described in detail above. The detector assembly 68 functions by capturing radiation from the surrounding geological formation, and converting it into light. The generated light is then transmitted to the light-sensing device 74. The light impulses are transformed into electrical impulses. In the illustrated embodiment, the crystal 72, the light-sensing device 74, and the optical interface 76 are hermetically sealed inside a detector housing 78. Further, the optical interface 76 includes a window 80 hermetically sealed into the detector housing 78. Typically, the window 80 facilitates radiation-induced scintillation light to pass out of the detector housing 78 for measurement by the light-sensing device 74. As will be appreciated, the optical window 80 is made of a material that is transmissive to scintillation light given off by the scintillator crystal 72. In addition, in certain embodiments, the detector casing 78 may be made of stainless steel, or aluminum. In the illustrated embodiment, a detector cable 82 connects the detector assembly 68 to a power source 84 and data processing circuitry 86. Data based on the impulses from the photomultiplier tube 74 may be transmitted "up-hole" to analyzing equipment, such as data processing cicuitry 86. Alternatively, the data may be stored locally downhole. Furthermore, in the illustrated embodiment, the data processing unit 86 may be electrically coupled to an operator workstation 88, which in turn is coupled to an output device 90.

Sometimes the data may be obtained and transmitted while drilling, i.e., "measurements while drilling" (MWD). As will be appreciated, the scintillation element in the well-logging tool is configured to function at very high temperatures and under harsh shock and vibration conditions. Accordingly, the scintillator material has many of the properties discussed previously, e.g., high light output and energy resolution, as well as fast decay time. Also, in the illustrated embodiment of FIG. 4, the scintillator is generally small enough to be enclosed in package suitable for a very constrained space. The threshold of the acceptable properties has been raised considerably as drilling is undertaken at much greater depths. For example, the ability of conventional scintillators to produce strong light output with high resolution can be seriously imperiled as drilling depth is increased. Thus, the scintillator materials described in detail above are particularly advantageous for the well-logging tool 66 illustrated in FIG. 4.

Figure 5:
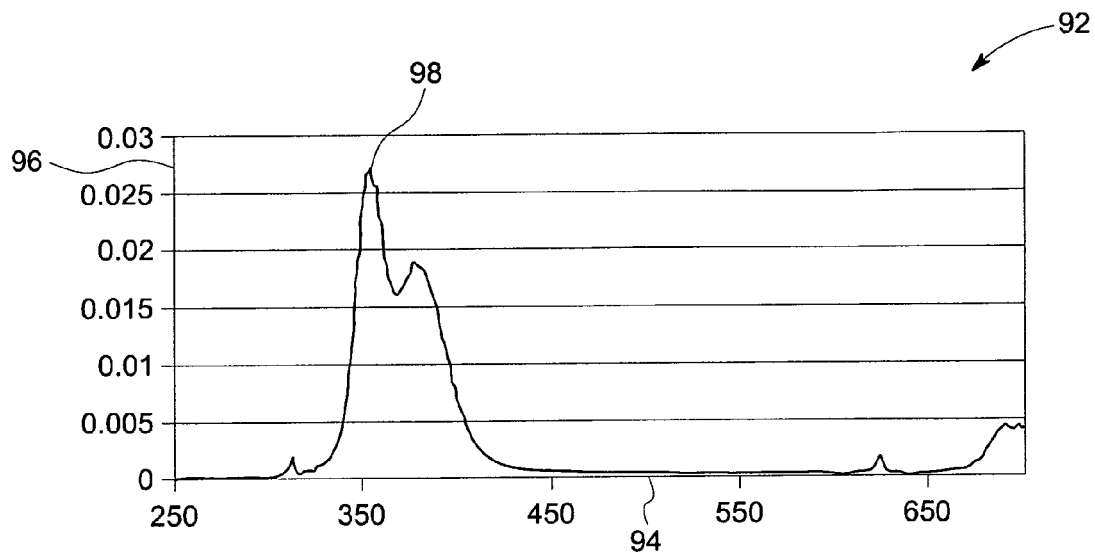
FIG. 5 is a graphical representation of the emission spectrum under X-ray excitation for a scintillator composition represented by $A_2LnX_7$ and having a cerium activator ion.
Figure 6:
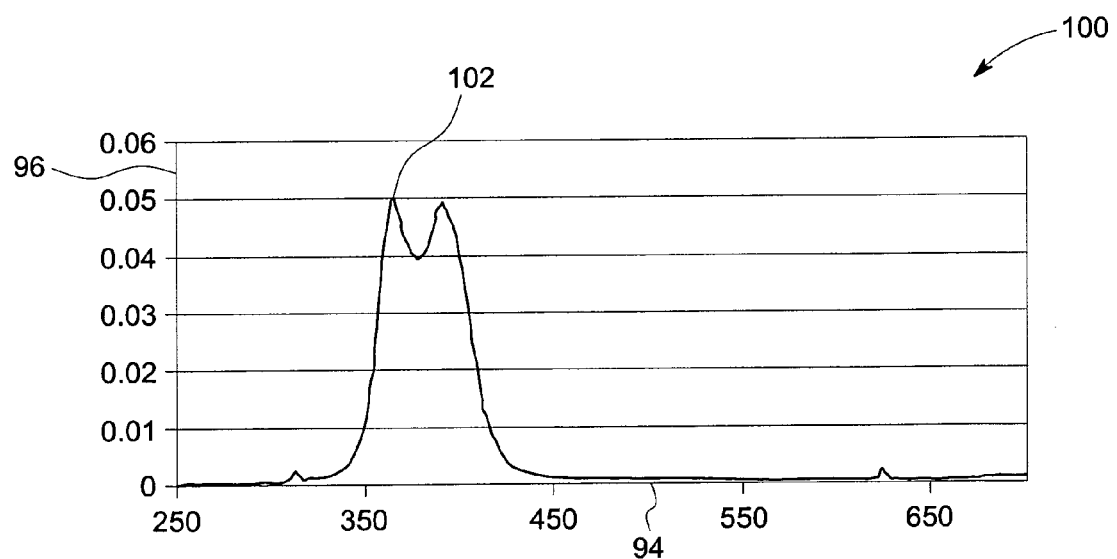
FIG. 6 is a graphical representation of the emission spectrum under X-ray excitation for a scintillator composition represented by $ALnX_5$ and having a cerium activator ion.

FIG. 5 is a graphical representation of an exemplary emission spectrum 92 under X-ray excitation for a scintillator composition represented by $A_2LnX_7$ and having cerium as an activator ion. In the illustrated figure, the abscissa 94 represents the wavelength values, whereas the ordinate 96 represents the emission intensity. In the illustrated embodiment, the emission spectrum 92 peaks at a wavelength of around 350 nm as represented by peak 98. Similarly, FIG. 6 is a graphical representation of an exemplary emission spectrum 100 under X-ray excitation for a scintillator composition represented by $ALnX_5$ and having cerium as an activator ion. In the illustrated embodiment, the emission spectrum 100 peaks at about 350 nm as shown by peak 102.

In certain embodiments, the scintillator composition may be prepared by a variety of techniques. As will be appreciated, the scintillator compositions may also contain a variety of reaction products of these techniques. Typically, the scintillator composition is prepared by mixing the different precursor powders in the predetermined proportions followed up by operations, such as calcinations, die forming, sintering, and/ or hot isostatic pressing. In some embodiments, the precursors may include salts, oxides, halides, oxalates, carbonates, nitrates, or combinations thereof. In other embodiments, the rare earth element halide may be provided as a single reactant, for example, a rare earth element halide, such as lanthanum chloride, which is commercially available. In certain embodiments, one or more rare earth element halides may be combined with one or more alkali metal halides in a desirable proportion. Further, a precursor of the activator ion may be mixed with this mixture.

The mixing of the reactants may be carried out by any suitable techniques, which ensure thorough and uniform blending. For example, mixing may be carried out in an agate mortar and pestle. Alternatively, the mixing may be achieved by a blender or pulverization apparatus, such as a ball mill, a bowl mill, a hammer mill, or a jet mill. In some embodiments, the mixture may contain various additives, such as fluxing compounds and binders. Depending on compatibility and/or solubility, various liquids, e.g., heptane, or an alcohol, such as ethyl alcohol, may sometimes be used as a medium during milling. As will be appreciated, suitable milling media include materials that do not unacceptably contaminate the scintillator composition, because contamination could adversely affect the scintillator properties, such as light-emitting capability.

Once blended, the precursor mixture may be fired under temperature and time conditions sufficient to convert the mixture into a solid solution. As will be appreciated, these conditions depend in part on the specific type of matrix material and activator being used. In certain embodiments, the firing may be carried out in a furnace, at a temperature in a range from about 500° C. to about 1000° C. In these embodiments, the firing time may range from about 15 minutes to about 10 hours. As will be appreciated, it is desirable to perform firing in an atmosphere which is free of oxygen and moisture. In an exemplary embodiment, the firing may be carried out in a vacuum, or in an atmosphere of inert gas, such as nitrogen, helium, neon, argon, krypton, and xenon. Upon completion of firing, the resulting material may be pulverized to convert it into powder form. Further, a variety of techniques may be employed to process the powder into radiation detector elements.

FIG. 7 is a flow chart illustrating an exemplary process 104 or method of operation of a detector element e.g., radiation detector 20 (see FIG. 1) or radiation detector 40 (see FIG. 2). As illustrated, the process 104 begins when the radiation is transmitted through an object (block 106). As described with reference to FIG. 1, in certain embodiments, the act of transmitting radiation may involve disposing a radioactive element in the target, such as human being. The transmitted radiation is then received by a scintillator material, which then converts the radiation into visible photons (block 108). In certain embodiments, the scintillator material may include the scintillator composition of the present technique as described in detail above. In these embodiments, the scintillator may be in the form of pixels, wherein each scintillator is coupled to a photon detector, such as photon detector 24 (see FIG. 1) or photon detector 44 (see FIG. 2). The photon detector then detects the visible radiation and converts it into electrical signals (block 110). In certain embodiments, the photon detector may include a photomultiplier tube, or a photodiode.

As with nuclear imaging detectors, such as PET and well-logging tools, the composition of other devices employing the scintillator depends largely on the scintillator characteristics, which in turn are directly related to scintillator composition. Generally, for scintillators responsive to high-energy radiation such as, gamma rays and X-rays, it is desirable to have high light output (LO), short decay time, reduced afterglow, high "stopping power", and acceptable energy resolution. Hence, although the scintillator compositions of the present technique are described mainly with reference to the PET imaging system and well-logging tool, it may be employed in other applications where similar properties are desirable.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A detector element comprising:
   a scintillator material configured to convert an incident radiation into photons, wherein the scintillator material comprises:
      a matrix material comprising:
         an alkaline earth metal, wherein the alkaline earth metal comprises strontium, or calcium, or magnesium, or combinations thereof;
         a rare earth element halide, wherein the rare earth element halide comprises at least one rare earth element and at least one halide ion;
      an activator ion for the matrix material, wherein the activator ion comprises cerium, or bismuth, or praseodymium, or combinations thereof; and
   a photon detector optically coupled to the scintillator material and configured to convert the photons into electrical signals.

2. The detector element of claim 1, wherein the detector element comprises a nuclear imaging detector.

3. The detector element of claim 2, wherein the detector element comprises a positron emission tomography detector.

4. The detector element of claim 1, wherein the detector element comprises a well-logging tool.

5. The detector element of claim 1, wherein the at least one halide ion comprises chlorine and bromine, or bromine and iodine, or chlorine and iodine, or chlorine and bromine and iodine.

6. A scintillator composition comprising: a matrix material represented by $ALnX_5$, wherein A comprises an alkaline earth metal, wherein Ln comprises a rare earth element, and wherein X comprises a halide ion, wherein the halide ion comprises chlorine and bromine, or bromine and iodine, or chlorine and iodine, or chlorine and bromine and iodine; and an activator ion for the matrix material, wherein the scintillator composition produces visible photons in response to impinging radiation, wherein the impinging radiation includes X-ray radiation, or beta radiation, or gamma radiation, or combinations thereof, wherein the activator ion comprises cerium and bismuth, or bismuth and praseodymium, or cerium and bismuth and praseodymium.

7. A method of operation of a detector element comprising: transmitting radiation through an object; receiving the radiation by a scintillator material to produce photons which are characteristic of the radiation, wherein the scintillator material comprises: a matrix material comprising: an alkaline earth metal; a rare earth element halide, wherein the rare earth element halide comprises at least one rare earth element and at least one halide ion, wherein the halide ion comprises chlorine and bromine, or bromine and iodine, or chlorine and iodine, or chlorine and bromine and iodine; an activator ion for the matrix material; and detecting the photons by a photon detector optically coupled to the scintillator material and configured to convert the photons into electrical signals, wherein the activator ion comprises cerium and bismuth, or bismuth and praseodymium, or cerium and bismuth and praseodymium.

* * * * *